United States Patent
Akita et al.

(10) Patent No.: US 9,486,945 B2
(45) Date of Patent: Nov. 8, 2016

(54) METHOD AND DEVICE FOR CURING A THERMOSETTING POLYMER

(75) Inventors: Yasuhiro Akita, Woluwe-St.-Lambert (BE); Andrew Willett, Etterbeek (BE)

(73) Assignee: TOYOTA MOTOR EUROPE NV/SA, Brussels (BE)

( * ) Notice: Subject to any disclaimer, the term of this patent is extended or adjusted under 35 U.S.C. 154(b) by 486 days.

(21) Appl. No.: 13/498,448

(22) PCT Filed: May 4, 2011

(86) PCT No.: PCT/EP2011/057162
§ 371 (c)(1),
(2), (4) Date: May 25, 2012

(87) PCT Pub. No.: WO2012/149973
PCT Pub. Date: Nov. 8, 2012

(65) Prior Publication Data
US 2012/0283348 A1    Nov. 8, 2012

(51) Int. Cl.
*B29C 35/12* (2006.01)
*B29C 35/08* (2006.01)

(52) U.S. Cl.
CPC .......... *B29C 35/0805* (2013.01); *B29C 35/12* (2013.01); *B29C 2035/0855* (2013.01)

(58) Field of Classification Search
CPC .............. B29C 35/12; B29C 35/0805; B29C 2035/0855
See application file for complete search history.

(56) References Cited

U.S. PATENT DOCUMENTS

| | | |
|---|---|---|
| 4,456,806 A | 6/1984 | Arimatsu |
| 4,897,432 A | 1/1990 | Lee et al. |
| 5,738,915 A * | 4/1998 | Fathi ...................... B05D 3/029 257/E21.241 |
| 6,538,066 B2 * | 3/2003 | Watanabe et al. ............ 525/184 |
| 2003/0224082 A1 | 12/2003 | Akopyan |
| 2009/0145740 A1 | 6/2009 | Sen et al. |

FOREIGN PATENT DOCUMENTS

| | | |
|---|---|---|
| DE | 101 29 004 A1 | 1/2003 |
| JP | H5-79208 B2 | 11/1993 |
| JP | 6-126815 A | 5/1994 |
| JP | 11-300766 A | 11/1999 |

OTHER PUBLICATIONS

International Search Report mailed Jan. 27, 2012 of PCT/EP2011/057162 & Written Opinion.

* cited by examiner

*Primary Examiner* — Sanza McClendon
(74) *Attorney, Agent, or Firm* — Andrews Kurth Kenyon LLP

(57) ABSTRACT

The present invention concerns a method and a device for curing a thermosetting polymer. The method comprises the steps of irradiating the thermosetting polymer with microwaves at a first power level so as to heat up the thermosetting polymer by dielectric heating, and when the thermosetting polymer reaches a first predetermined temperature, irradiating the thermosetting polymer with microwaves at a second power level, substantially higher than the first power level, to further heat up the thermosetting polymer by dielectric heating. The device comprises an enclosure for receiving the thermosetting polymer, a microwave emitter for emitting microwave radiation into the enclosure, and a control unit for controlling a microwave emission power of the microwave emitter according to the abovementioned method.

15 Claims, 2 Drawing Sheets

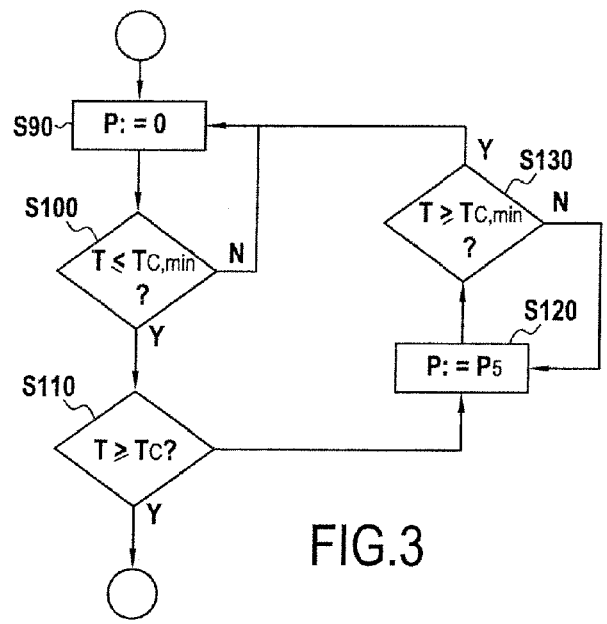
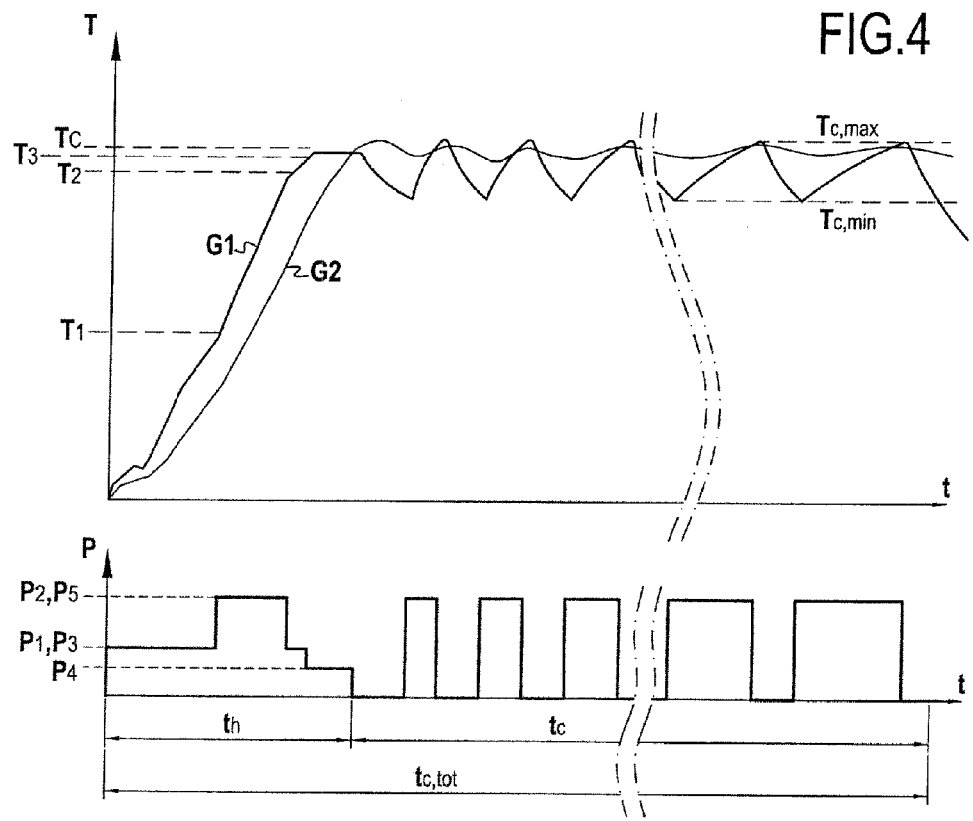

METHOD AND DEVICE FOR CURING A THERMOSETTING POLYMER

This is a 371 national phase application of PCT/EP2011/057162 filed 4 May 2011, the contents of which are incorporated herein by reference.

TECHNICAL FIELD

The disclosure relates to a method and a device for curing a thermosetting polymer.

BACKGROUND

Composite materials combine two or more distinct materials with complementary qualities, such as for instance lightness and strength. Various composite materials are known to the skilled person. For instance, honeycomb sandwiches, combining a honeycomb core and two facing panels, in metal, polymer and/or other materials, have long been used in a number of different applications, and in particular for structural elements in the aerospace and shipbuilding fields. Other composite materials combine a solid matrix of a first material with reinforcing elements, usually fibers, of a second material embedded in the matrix. Such composite materials include ceramic matrix composites (CMC), metal matrix composites (PMC) and polymer matrix composites (PMC). Advances in various fields, such as nanotechnology, have expanded the use of these materials to many technical fields, such as power generation, construction, medical implants and prostheses, transportation, etc. This has led to further competition to increase the performances and reduce the drawbacks of these materials.

Among composite materials, polymer matrix composites (PMC) and in particular fiber-reinforced polymers (FRP), such as, among others, carbon-, glass- and/or aramid-fiber reinforced polymers are particularly widespread. Fiber-reinforced polymers offer an advantageous combination of the properties, in particular the mechanical properties, of a polymer matrix and reinforcing fibers embedded in said polymer matrix. Among the polymers matrices used in such fiber-reinforced polymers, the most common are thermosetting polymers. To produce a fiber-reinforced thermosetting polymer article, the fibers are first impregnated with a resin, i.e. a prepolymer in a soft solid or viscous state, shaped into a given form, usually by molding, and the resin is then irreversibly hardened by curing. During curing, the prepolymer molecules crosslink with each other to form a three-dimensional network. To initiate or at least accelerate this crosslinking reaction, the resin is usually energized using heat and/or radiation.

A method for curing a fiber-reinforced polymer article using microwaves was disclosed in Japanese patent publication JP H5-79208 B2. According to this first prior art method, the uncured fiber-reinforced polymer article is held in a mold made of a similar material with substantially the same dielectric properties. The mold containing the uncured fiber-reinforced polymer is irradiated with microwaves, whose energy is converted into heat by both the mold and the uncured fiber-reinforced polymer inside it. However, in this method, since the mold absorbs part of the microwave radiation, the dielectric heating of fiber-reinforced polymer article may not be sufficiently homogeneous. In particular, in a thick-walled hollow article such as a pressure tank, the inner layers of the article could be insufficiently cured as a result.

Another method for curing a fiber-reinforced polymer article using microwaves was disclosed in Japanese patent application Laid-Open JP H11-300766 A. According to this second prior art method, the uncured fiber-reinforced polymer article is held in a mold made of a material that is substantially transparent to microwaves. In this method, the dielectric heating by the microwave radiation is substantially limited to the fiber-reinforced polymer, rather than the mold. However, this method also has the potential drawback of insufficiently homogeneous curing, in particular in thick-walled hollow articles, such as high-pressure gas tanks.

SUMMARY

A first object of the disclosure is that of obtaining a more homogeneous curing of a thermosetting polymer, in particular in a thick-walled and/or fiber-reinforced article.

Accordingly, in a first aspect, a method for curing a thermosetting polymer comprises the steps of irradiating the fiber-reinforced thermosetting polymer with microwaves at a first power level so as to heat up the thermosetting polymer by dielectric heating, and, when the thermosetting polymer reaches a first predetermined temperature, irradiating the thermosetting polymer with microwaves at a second power level, substantially higher than the first power level, to further heat up the thermosetting polymer by dielectric heating.

Consequently, an initial temperature divergence is minimized during the first stage, whereas, when the thermosetting polymer is irradiated at the second power level, heat conduction between the hotter and cooler areas will limit the spread in temperatures between those areas, thus providing a more homogeneous curing.

According to a second aspect, when the thermosetting polymer reaches a predetermined curing temperature, higher than said first predetermined temperature, microwave irradiation is controlled in a temperature-maintaining mode so as to maintain a temperature of the thermosetting polymer within a predetermined range around the curing temperature. In particular, this temperature-maintaining mode can be maintained during a predetermined curing time. Maintaining for a given time a predetermined curing temperature further ensures a more homogeneous curing of the thermosetting polymer.

According to a third aspect, the microwave irradiation is intermittent in the temperature-maintaining mode. With an intermittent microwave irradiation, it is particularly easy to maintain the temperature throughout the whole article within a narrow band around the curing temperature, since the outer layers of the article both heat up and cool off more quickly than the inner layers of the same article. Moreover, as the thermosetting polymer is progressively cured, its polar groups cross-link with each other and the dielectric thermal effect of the microwave irradiation on the thermosetting polymer decreases. With a continuous microwave irradiation, the power level of the microwave irradiation would have to be continuously adapted to compensate for this decrease in the dielectric thermal effect. With an intermittent microwave irradiation, on the other hand, it is possible to maintain the temperature of the article within a narrow range by changing the duration of the active irradiation periods, rather than the power level.

According to a fourth aspect, when the thermosetting polymer reaches a second predetermined temperature, higher than the first predetermined temperature but lower than a predetermined curing temperature, the thermosetting polymer is irradiated at a third power level, substantially lower than the second power level, so that heat conduction will allow the temperature in the coolest areas of the thermosetting polymer to catch up with the temperature in the hottest areas of the thermosetting polymer.

According to a fifth aspect, the thermosetting polymer is reinforced with embedded fibers, in particular electrically conductive fibers, such as carbon fibers. The strength of the cured thermoset is greatly increased in this way. In some cases, this even allows to cure the thermosetting polymer outside of a mold or container, since the fibers offer a degree of shape stability even when the thermosetting polymer is not yet in a solid state. Electrically conductive fibers can also contribute to the conversion of microwave energy into heat, by resistive heating of the fibers due to currents induced by the microwaves in the fibers.

According to a sixth aspect, the thermosetting polymer forms a hollow vessel, and in particular a high-pressure gas pressure tank. The staged microwave heating offers a more homogeneous heating and curing of such articles than alternative curing methods.

According to a seventh aspect, a device for curing a thermosetting polymer, comprises an enclosure for receiving the thermosetting polymer, a microwave emitter for emitting microwave radiation into the enclosure, and a control unit for controlling a microwave emission power of the microwave emitter, configured to command a first power level of the microwave emitter in a first stage to heat up the thermosetting polymer by dielectric heating, and a second power level of the microwave emitter, substantially higher than the first power level, in a second stage, to continue heating up the thermosetting polymer.

According to an eighth aspect, the control unit is configured to command the temperature-maintaining mode of the microwave emitter in a subsequent stage to maintain a temperature of the thermosetting polymer within a predetermined range around a predetermined curing temperature of the thermosetting polymer.

According to a ninth aspect, the control unit is also configured to command a third power level of the microwave emitter in a third stage, after the second stage, substantially lower than the second power level, to continue heating up the thermosetting polymer.

According to a tenth aspect, the curing device further comprises a timer connected to the control unit. The control unit can thus be configured to command the various operational stages in function of time.

According to an eleventh aspect, the curing device further comprises a temperature sensor connected to the control unit. The control unit can thus be configured to command the various operational stages in function of temperature.

The above summary of some example embodiments is not intended to describe each disclosed embodiment or every implementation of the invention. In particular, selected features of any illustrative embodiment within this specification may be incorporated into an additional embodiment unless clearly stated to the contrary.

BRIEF DESCRIPTION OF THE DRAWINGS

The invention may be more completely understood in consideration of the following detailed description of various embodiments in connection with the accompanying drawings, in which:

FIG. 3 is a flow chart representing a control process of the microwave curing device of FIG. 1 during a subsequent temperature-maintaining phase of the curing method; and FIG. 4 is a graph representing microwave power and polymer temperature in function of time during execution of the curing method.

Figure 1:
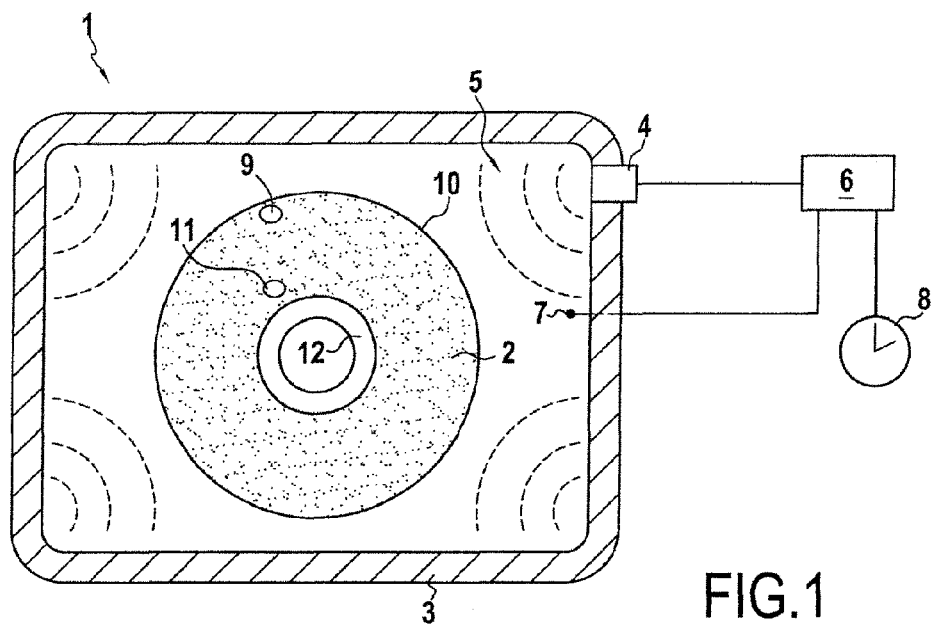
FIG. 1 is a schematic cut view of a thick-walled fiber-reinforced thermosetting polymer article in a microwave curing device during execution of a curing method according to an embodiment of the invention.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the scope of the invention.

DETAILED DESCRIPTION

For the following defined terms, these definitions shall be applied, unless a different definition is given in the claims or elsewhere in this specification.

All numeric values are herein assumed to be preceded by the term "about", whether or not explicitly indicated. The term "about" generally refers to a range of numbers that one of skill in the art would consider equivalent to the recited value (i.e. having the same function or result). In many instances, the term "about" may be indicative as including numbers that are rounded to the nearest significant figure.

Any recitation of numerical ranges by endpoints includes all numbers within that range (e.g., 1 to 5 includes a.o. 1, $\frac{4}{3}$, 1.5, 2, e, 2.75, 3, π, 3.80, 4, and 5).

Although some suitable dimension ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

FIG. 1 shows a cross-cut of a microwave curing device 1 containing a thick-walled carbon-fiber-reinforced thermosetting polymer article 2 which is being cured using a curing method according to an embodiment of the invention. The thermosetting polymer may be in particular an epoxy resin, but other types of thermosetting polymers, such as, for example, polyimides, may be considered by the skilled person depending on the circumstances. While the thickness of the carbon-fiber-reinforced thermosetting polymer is not particularly limited, it may preferably be in a range approximately between 10 mm and 100 mm. The microwave curing device 1 comprises an enclosure 3 and a microwave emitter 4, such as a cavity magnetron, which emits microwaves 5, that is, electromagnetic radiation in the 300 MHz-300 GHz frequency range, and preferably in an ISM (industrial, scientific, and medical) frequency band, such as those around 915 MHz and 2.45 GHz. This microwave radiation 5 is substantially confined within the enclosure 3, wherein the thick-walled carbon-fiber-reinforced thermosetting polymer article 2 is also received, and directly heats up the article 2, both through dielectric heating of the thermosetting polymer matrix and through resistive heating of the reinforcing embedded carbon fibers by induced currents. The microwave curing device 1 also comprises a control unit 6, connected to the microwave emitter 4, and a timer 7 and a temperature sensor 8 connected to the control unit 6.

The absorption of electromagnetic radiation and its conversion into heat in a given material depends from its so-called dielectric loss factor $\epsilon_r''$, that is, the product of the relative dielectric constant $\epsilon_r'$ of the material and the tangent of its dielectric loss angle $\delta$, at the frequency of the electromagnetic radiation, and this according to the following equation:

$$P_d = \omega E^2 \epsilon_0 \epsilon_r'' = \omega E^2 \epsilon_0 \epsilon_r' \tan \delta$$

wherein $P_d$ represents the dissipated power, $\omega$ the angular frequency of the electromagnetic radiation, E the electrical field strength and $\epsilon_0$ the permittivity of free space (approximately $8.854 \cdot 10^{-12}$ F/m).

Because of absorption, the electromagnetic radiation is attenuated as it travels through a material. This attenuation $\alpha$ follows this second equation:

$$\alpha = \frac{\omega}{c} \sqrt{\frac{\epsilon_r'(\sqrt{1+\tan^2\delta} - 1)}{2}}$$

wherein c represents the speed of light. Since $\tan \delta \ll 1$, the attenuation $\alpha$ can also be approximated as:

$$\alpha \approx \frac{\omega \sqrt{\epsilon_r'} \tan\delta}{2c}$$

Consequently, as the microwave radiation 5 is attenuated as it travels through the carbon-fiber-reinforced thermosetting polymer, less heat is generated by microwave dissipation at the innermost layers of the article 2 than at its outer surface. As different degrees of dielectric heating cause the temperature to diverge between different layers of the article 2, heat is conducted from the hottest to the coldest layers, limiting this temperature divergence. Nevertheless, if the article 2 receives microwave radiation at a continuously high power level, this temperature divergence will prevent a homogeneous degree of curing throughout the article 2.

In order to accelerate the heating-up phase of this microwave curing method, while preventing an excessive temperature divergence within the article 2, the heating-up phase is divided in more than one stage, the control unit 6 commanding a different power level of the microwave emitter 4 during each stage.

Figure 2:
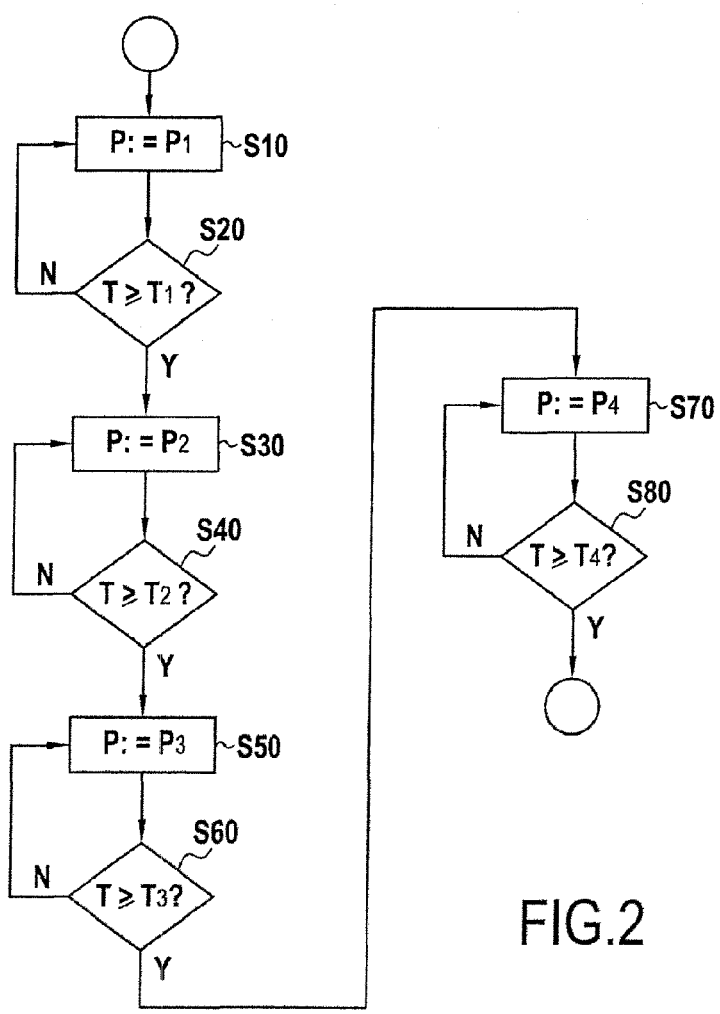
FIG. 2 is a flow chart representing a control process of the microwave curing device of FIG. 1 during a heating up phase of the curing method.

Turning now to FIG. 2, in a first step S10, the control unit 6 activates the microwave emitter 4, which, in a first stage in the heating-up phase starts emitting microwaves 5 into the enclosure 3, at a first, low power level $P_1$. In the next step, S20, the control unit 6 checks whether a first predetermined temperature $T_1$ is reached in the article 2. This can be done through a direct temperature measurement by the temperature sensor 8 or, indirectly, using the timer 7 and a predetermined time-temperature correspondence. If the temperature $T_1$ is not reached yet, the control process loops back to the first step S10, and the first power level $P_1$ is maintained. However, if the result from this check is positive, and the first predetermined temperature $T_1$ has been reached, the control process progresses to the next step S30, and a second stage in the heating-up phase, in which the power of the microwave emitter 4 is increased to a second power level $P_2$. As can be seen in FIG. 4, when the temperature of a zone 9 near the outer surface 10 of the article 2, as illustrated by graph G1, reaches this first predetermined temperature $T_1$, heat conduction from the outer to the inner layers of the article 2 have limited the temperature spread, and the temperature of a deeper zone 11 in the article 2, illustrated by graph G2, is lower only by a difference $\Delta T_1$. By then increasing the power P of the microwave emitter 4 to the higher second power level $P_2$, as shown by graph G3, the global increase in temperature is accelerated, while the existing temperature difference $\Delta T_1$ ensures significant heat conduction from the hotter to the cooler areas of the article 2, limiting further divergence.

Nevertheless, once the microwave emitter 4 is emitting at the second, higher power level $P_2$, in the next step S40 the control unit 6 checks whether a predetermined second temperature $T_2$, higher than the first temperature $T_1$, but still lower than a curing temperature $T_c$, is reached. As for the first temperature $T_1$, this can be done through a direct temperature measurement by the temperature sensor 8 or, indirectly, using the timer 7 and a predetermined time-temperature correspondence. As long as the second temperature $T_2$ is not reached, the control process loops back to the third step S30, and the second power level $P_2$ is maintained. However, if the result from this check is positive, and the second predetermined temperature $T_2$ has been reached, the control process progresses to the next step S50, and a third stage in the heating-up phase, in which the power of the microwave emitter 4 is initially decreased to a lower third power level $P_3$, which in the example illustrated in FIG. 4 is equal to the first power level $P_1$.

Once the microwave emitter 4 is emitting at the third power level $P_3$, in the next step S60 the control unit 6 checks whether a predetermined third temperature $T_3$, higher than the second temperature $T_2$, but still lower than the curing temperature $T_c$, is reached. As for the first and second temperatures $T_1$, $T_2$ this determination can be done through a direct temperature measurement by the temperature sensor 8 or, indirectly, using the timer 7 and a predetermined time-temperature correspondence. As long as the third temperature $T_3$ is not reached, the control process loops back to the third step S50, and the third power level $P_3$ is maintained. However, if the result from this check is positive, and the third predetermined temperature $T_3$ has been reached, the control process progresses to the next step S70, in which the power of the microwave emitter 4 is further decreased to an even lower fourth power level $P_4$.

This gradual decrease of the power levels in the third stage of the heating-up process allows the temperature spread between the outer and inner layers of the article 2 to decrease by heat conduction before the curing temperature $T_c$ is reached, as shown by the convergence between the graphs G1 and G2 in FIG. 4 at this third stage of the heating-up phase.

Once the microwave emitter 4 is emitting at the fourth power level $P_4$, in the next step S80 the control unit 6 checks whether the curing temperature $T_c$ is reached. Again, this can be done through a direct temperature measurement by the temperature sensor 8 or, indirectly, using the timer 7 and a predetermined time-temperature correspondence. As long as the curing temperature $T_c$ is not reached, the control process loops back to the fifth step to S70, and the third power level $P_3$ is maintained. However, if the result from this check is positive, and the curing temperature $T_c$ has been reached, the control unit 6 stops the heating-up mode and enters the temperature-maintaining mode, in which it follows the control process illustrated in FIG. 3. The heating-up mode has had, at this moment, a duration $t_h$.

The purpose of the temperature-maintaining mode is to maintain the article 2 at a temperature within a narrow band around the curing temperature $T_c$, between a maximum temperature threshold $T_{c,max}$ and a minimum temperature threshold $T_{c,min}$, during a curing period $t_c$.

Initially, in a first step S90 of the control process in this temperature-maintaining mode, the control unit 6 turns off the microwave emitter 4. Thus, as shown in FIG. 4, the temperatures in the article 2 will decrease as the article 2 cools off. Therefore, in a second step S100, the control unit 6 checks whether the minimum temperature threshold $T_{c,min}$ is reached. Again this can be done through a direct temperature measurement by the temperature sensor 8 or, indirectly, using the timer 7 and a predetermined time-temperature correspondence. As long as the minimum temperature threshold $T_{c,min}$ is not reached, the control process loops back, and the microwave emitter 4 is kept turned off. However, if the minimum temperature threshold $T_{c,min}$ is reached, the control process progresses to a subsequent step S110, in which the control unit checks whether the curing period $t_c$ has been completed. If the curing period $t_c$ has indeed been completed, the control process ends and the cured article 2 is left to cool off. If, however, the curing period $t_c$ has not been completed yet, the control process progresses to another step 120, in which the control unit 6 turns the microwave emitter 4 on again, at a fifth power level $P_5$, which in the illustrated embodiment is equal to the second power level $P_2$. The article 2 thus heats up again, so as to remain above the minimum temperature threshold $T_{c,min}$.

In the next step S120, the control unit 6 checks whether the maximum temperature threshold $T_{c,min}$ is reached. Again this can be done through a direct temperature measurement by the temperature sensor 8 or, indirectly, using the timer 7 and a predetermined time-temperature correspondence. As long as the maximum temperature threshold $T_{c,min}$ is not reached, the control process loops back, and the microwave emitter 4 keeps emitting at the fifth power level $P_5$, heating up the article 2. However, if the maximum temperature threshold $T_{c,max}$ is reached, the control process loops back to step S90, and the microwave emitter 4 is turned off again. The control unit 4 thus commands an intermittent microwave emission to maintain the temperature of the article 2 between the minimum and maximum temperature thresholds $T_{c,min}$ and $T_{c,max}$ until the curing period $t_c$ is been completed. It must be noted that, as the thermosetting polymer cures and its polar groups cross-link with each other, its dielectric loss factor $\in_r''$ will decrease and the article will heat up more slowly during the microwave emission at the same power level. Together, the total processing time $t_{c,tot}$ in the heating-up mode and the temperature maintaining mode is equal to the sum of the duration $t_h$ in the heating-up mode and the curing period $t_c$.

EXAMPLE

A composite workpiece with an epoxy matrix reinforced with embedded carbon fibers has been cured using the described curing device and method. The carbon fibers T-800SC carbon fibers produced by the Toray® Corporation, whereas the epoxy matrix was produced using the Denatite® XNR3103/XNH3103 bi-component system produced by Nagase Chemtex®. The workpiece was a tubular article with 50 mm thick walls wrapped around a plastic mandrel, and with a length of 300 mm, and a diameter of 200 mm.

Using a microwave emitter with a frequency of 2.45 GHz, a first power level $P_1$ of 1.02 kW, a second power level $P_2$ of 2.04 kW, a third power level $P_3$ of 1.02 kW, and a fourth power level of $P_4$ of 714 W and setting the first predetermined temperature $T_1$ at 80° C., the second predetermined temperature $T_2$ at 140° C., and the third predetermined temperature $T_3$ at 145° C., the workpiece reaches a curing temperature $T_c$ of 150° C. in a heating-up phase of a duration $t_h$ of approximately 60 minutes, wherein the temperature difference within the workpiece does not exceed 10° C. at the end of this heating-up phase.

The workpiece is subsequently submitted to a temperature-maintaining curing phase of a duration $t_c$ of approximately 270 minutes, with an intermittent microwave radiation at a fifth power level $P_5$ of 2.04 kW. After this process, the degree of curing throughout the workpiece, as indicated by the glass transition temperature measured by differential scanning calorimetry at various depths of the workpiece, is comparable to that of an identical workpiece cured for two hours at a temperature of 110° C., followed by five hours at 145° C., in a conventional oven. The total processing time $t_{c,tot}$ is thus cut by half with respect to this reference.

Those skilled in the art will recognize that the present invention may be manifested in a variety of forms other than the specific embodiments described and contemplated herein. Accordingly, departure in form and detail may be made without departing from the scope of the present invention as described in the appended claims.

The invention claimed is:

1. A method for curing a thermosetting polymer, comprising the steps of:
   irradiating the thermosetting polymer with microwaves at a first power level so as to heat up the thermosetting polymer by dielectric heating;
   checking whether a first determined temperature is reached through a temperature measurement with a temperature sensor; and
   when the thermosetting polymer reaches the first predetermined temperature, irradiating the thermosetting polymer with microwaves at a second power level, substantially higher than the first power level, to further heat up the thermosetting polymer by dielectric heating.

2. The method of claim 1, wherein, when the thermosetting polymer reaches a predetermined curing temperature, higher than said first predetermined temperature, microwave irradiation is controlled in a temperature-maintaining mode so as to maintain a temperature of the thermosetting polymer within a predetermined range around the curing temperature.

3. The method of claim 2, wherein, in the temperature-maintaining mode, the microwave irradiation is intermittent.

4. The method according to claim 2, wherein said temperature-maintaining mode is maintained during a predetermined curing time.

5. The method according to claim 1, wherein, when the thermosetting polymer reaches a second predetermined temperature, higher than the first predetermined temperature but lower than a predetermined curing temperature, the thermosetting polymer is irradiated at a third power level, substantially lower than the second power level.

6. The method according to claim 1, wherein the thermosetting polymer is reinforced with embedded fibers.

7. The method of claim 6, wherein the embedded fibers comprise electrically conductive fibers.

8. The method of claim 7, wherein the electrically conductive fibers comprise carbon fibers.

9. The method according to claim 1, wherein the thermosetting polymer forms a hollow vessel.

10. The method of claim 9, wherein the hollow vessel is a high-pressure gas tank.

11. A device for curing a thermosetting polymer, comprising:
- an enclosure for receiving the thermosetting polymer;
- a microwave emitter for emitting microwave radiation into the enclosure;
- a control unit for controlling a microwave emission power of the microwave emitter; and
- a temperature sensor connected to the control unit and configured to check whether a first determined temperature is reached through a temperature measurement with the temperature sensor; and
- wherein the control unit is configured to command a first power level of the microwave emitter in a first stage to heat up the thermosetting polymer by dielectric heating and, when the thermosetting polymer reaches the first predetermined temperature, a second power level of the microwave emitter, substantially higher than the first power level, in a second stage, to further heat up the thermosetting polymer by dielectric heating.

12. The device of claim 11, wherein the control unit is configured to command a temperature-maintaining mode of the microwave emitter in a subsequent stage to maintain a temperature of the thermosetting polymer within a predetermined range around a predetermined curing temperature of the thermosetting polymer.

13. The device of claim 12, wherein the microwave emission power of the microwave emitter in the temperature-maintaining mode is intermittent.

14. The device according to claim 11, further comprising a timer connected to the control unit.

15. A device for curing a thermosetting polymer, comprising:
- an enclosure for receiving the thermosetting polymer;
- a microwave emitter for emitting microwave radiation into the enclosure;
- a control unit for controlling a microwave emission power of the microwave emitter; and
- a temperature sensor connected to the control unit and configured to check whether a first determined temperature is reached through a temperature measurement with the temperature sensor; and, wherein
  - the control unit is configured to command a first power level of the microwave emitter in a first stage to heat up the thermosetting polymer by dielectric heating and, when the thermosetting polymer reaches the first predetermined temperature, a second power level of the microwave emitter, substantially higher than the first power level, in a second stage, to further heat up the thermosetting polymer by dielectric heating, and
  - the control unit is further configured to command a third power level of the microwave emitter in a third stage, after the second stage, said third power level being substantially lower than the second power level, to continue heating up the thermosetting polymer.

* * * * *